United States Patent [19]

Corbett et al.

[11] Patent Number: 4,544,682

[45] Date of Patent: Oct. 1, 1985

[54] POLYMERIC COMPOSITIONS POSSESSING IMPROVED FLAMMABILITY RESISTANCE

[75] Inventors: John M. Corbett, Newark, Ohio; Fred W. Neumann, Midland, Mich.

[73] Assignee: The Dow Chemical Company, Midland, Mich.

[21] Appl. No.: 643,945

[22] Filed: Aug. 24, 1984

[51] Int. Cl.⁴ .............................................. C08F 14/00
[52] U.S. Cl. ..................................... 521/142; 521/149; 525/327.6; 525/359.1; 526/262
[58] Field of Search ............. 525/327.6; 526/262; 521/142, 149

[56] References Cited

U.S. PATENT DOCUMENTS

| | | | |
|---|---|---|---|
| 3,651,171 | 3/1972 | von Bonin et al. | 260/857 G |
| 3,723,375 | 3/1973 | Fields et al. | 525/327.6 |
| 4,059,545 | 11/1977 | Corbett et al. | 526/46 |
| 4,108,943 | 8/1978 | Lee | 265/878 R |
| 4,124,749 | 11/1978 | Aharoni | 525/327.7 |
| 4,129,619 | 12/1978 | Fava | 260/901 |
| 4,136,135 | 1/1979 | Lee | 260/874 |
| 4,187,364 | 2/1980 | Darms et al. | 525/329.9 |

*Primary Examiner*—Joseph L. Schofer
*Assistant Examiner*—Bernard Lipman
*Attorney, Agent, or Firm*—Thomas J. Mielke

[57] ABSTRACT

A flame retardant polymeric composition comprising a monoalkenyl aromatic polymer having polymerized therein from about 5 to about 25 mole percent of an imide having appended, to the nitrogen atom, a bromine substituted aliphatic hydrocarbon radical. The composition is formed by melt blending a copolymer of a monoalkenyl aromatic monomer and an ethylenically-unsaturated anhydride with a brominated, primary aliphatic amine.

21 Claims, No Drawings

POLYMERIC COMPOSITIONS POSSESSING IMPROVED FLAMMABILITY RESISTANCE

BACKGROUND OF THE INVENTION

In the past, flame retardancy in polymers has generally been achieved though one of two methods.

Flame retardancy can be achieved through the use of a halogenated monomer. Lee, U.S. Pat. No. 4,108,943, July 5, 1977, discloses such a composition. The use of a halogenated monomer is often unsatisfactory in practice because it requires, as a first step, the halogenation of the monomer. This separate step is costly and inconvenient.

Flame retardancy can be achieved through the use of various halogenated additives. Lee, U.S. Pat. No. 4,108,943, July 5, 1977, discloses such a composition. The use of halogenated additives to achieve flame retardancy is undesirable in at least one aspect. Addition of an amount of halogenated additive sufficient to achieve the desired amount of flame retardancy will often have a very deleterious effect on the physical properties of the resultant polymer. For example, addition of a halogenated additive will often lower the thermal stability of the polymer leading to increased polymer degradation on exposure to heat.

It is desirable to produce a flame resistant polymer without deleteriously affecting the physical properties of the resultant polymer. It is to this goal that the present invention is directed.

Prior Art

Production of styrene/maleic anhydride copolymers is well-defined in the prior art (Lee, U.S. Pat. No. 4,136,135, Mar. 3, 1977; Narayama et al., U.S. Pat. No. 3,614,212, Feb. 8, 1972). As discussed above, improving the flame retardancy of such copolymers is generally accomplished through the use of halogen containing additives. This process is also well-known in the prior art (Lee, U.S. Pat. No. 4,136,135, Mar. 3, 1977; Fox, U.S. Pat. No. 4,028,335, June 7, 1977; Whelan, U.S. Pat. No. 3,998,783, Dec. 21, 1976).

SUMMARY OF THE INVENTION

The present invention is a flame retardant polymeric composition. The composition comprises a monoalkenyl aromatic polymer having polymerized therein from about 5 to 25 mole percent, based on total monomer polymerized therein, of an imide having appended, to the nitrogen atom, a bromine substituted aliphatic hydrocarbon radical. Optionally, the composition also contains an ethylenically-unsaturated anhydride.

The polymeric composition of the present invention is prepared by melt blending a copolymer of a monoalkenyl aromatic monomer and an ethylenically-unsaturated anhydride with a brominated primary aliphatic amine.

Alternatively, though generally less desirable, the claimed composition can be prepared by reacting the brominated primary amine with an anhydride containing monomer to form an imide monomer. The imide monomer is subsequently polymerized with a monoalkenyl aromatic monomer and, optionally, an ethylenically unsaturated anhydride monomer.

DETAILED DESCRIPTION OF THE INVENTION

The polymeric composition claimed in the present invention is prepared by melt-blending a copolymer of a monoalkenyl aromatic monomer and an ethylenically-unsaturated anhydride with a brominated primary aliphatic amine. The melt-blending occurs at a temperature at or above the melting point of the copolymer but below the temperature at which the copolymer significantly degrades. The melt-blending continues for a length of time sufficient to convert an effective amount of the ethylenically-unsaturated anhydride present in the copolymer to an imide.

Methods of polymerization suitable for forming the copolymer are well-known in the art. Suitable is any method of polymerization which proceeds through an addition mechanism. Such processes have been described at length in the literature, especially in U.S. Pat. Nos. 2,971,939, 2,769,804 and 3,336,267. The teachings of these patents are herein incorporated by reference thereto.

The imide group is present in the claimed composition in concentrations between about 5 to about 25 mole percent of monomer polymerized therein. Preferably, the imide group is present in the composition of the invention in concentrations of between about 10 and about 15 mole percent of monomer polymerized therein.

The imide group has appended, to the nitrogen atom, a bromine substituted aliphatic or aromatic substituted aliphatic hydrocarbon radical. Bromine is present on said appended hydrocarbon radical in an amount of from about 4 to about 34 percent by weight total composition.

The melt blending occurs at a temperature above the melting point of the copolymer but below the temperature at which the copolymer significantly degrades. The temperature will generally be between about 160° C. and about 225° C. At these temperatures, substantially all of the brominated primary aliphatic amine reacts with the anhydride present in the copolymer so long as the copolymer comprises at least an equimolar amount of anhydride.

Any free-radically polymerizable ethylenically unsaturated anhydride is capable of being used in the present invention. Suitably, the anhydride containing monomer is chosen from the following non-exclusive list: maleic anhydride, phenyl maleic anhydride, citraconic anhydride, or itaconic anhydride. Preferably, the anhydride containing monomer is maleic anhydride.

The other monomer which comprises the interpolymer is selected from the group of monomers which are polymerizable with the anhydride containing monomer. Suitably, the other monomer may be a monoalkenyl aromatic monomer of the formula:

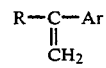

where Ar represents an aromatic hydrocarbon radical, or an aromatic halohydrocarbon radical, and R is hydrogen or an alkyl radical containing up to 12 carbon atoms. Examples of suitable monoalkenyl aromatic monomers include: styrene; alpha-alkyl monovinylidene monoaromatic compounds (such as alpha-methylstyrene, alpha-ethylstyrene, alpha-methylvinyltoluene, alpha-methyldialkylstyrene, and the like); and ring-substituted alkyl styrenes (such as ortho-, meta-, and para-vinyltoluene; o-ethylstyrene; p-ethylstyrene; 2,4-dimethylstyrene; p-tertiarybutyl styrene; and the like).

Also suitable are ethylenically unsaturated aliphatic monomers including: alpha,beta-unsaturated monobasic acids and derivatives thereof (such as acrylic acid, methyl acrylate, ethyl acrylate, butyl acrylate, 2-ethylhexyl acrylate, methacrylic acid and the corresponding esters thereof, such as methyl methacrylate, and the like, acrylamide, methacrylamide); vinyl halides such as vinyl chloride, vinyl bromide, and the like; vinylidene chloride, vinylidene bromide, and the like; vinyl esters such as vinyl acetate, vinyl propionate, and the like; dialkyl maleates or fumarates such as dimethyl maleate, diethyl maleate, dibutyl maleate, the corresponding fumarates, and the like; ethylene, isobutylene, and the like.

For the purpose of forming a foamed polymeric composition, the claimed interpolymer is preferably comprised of styrene and an anhydride containing monomer. Styrene is preferred because of its low cost relative to other suitable monomers, ready availability, and ability to form rigid foams.

The brominated primary amine is suitably any brominated primary aliphatic amine, having between 1 and 4 carbon atoms, such as 2-bromoethylamine, etc. or brominated-aromatic substituted aliphatic primary amine having between about 7 and 12 carbon atoms. Because of its stability, availability and reactivity, the brominated primary amine is, preferably 2,4,5-tribromobenzyl amine.

While this is the preferred method of preparing the claimed composition, it is not intended to be exclusive. Another method is to react the ethylenically-unsaturated anhydride with at least an equimolar amount of the brominated primary aliphatic amine. This reaction is allowed to continue until substantially all of the ethylenically-unsaturated anhydride is converted to an ethylenically-unsaturated imide. The ethylenically-unsaturated imide is then polymerized with a monoalkenyl aromatic monomer and, optionally, an ethylenically-unsaturated anhydride to form the claimed polymeric composition.

The reaction between the ethylenically-unsaturated anhydride and the brominated amine is carried out in solution.

Substantially all of the brominated amine reacts with the ethylenically unsaturated anhydride so long as there is at least an equimolar amount of anhydride present.

Again, the methods to polymerize the imide monomer and the monoalkenyl aromatic monomer are well-known in the art. Suitable is any method which proceeds through a free-radical mechanism. Examples of such methods have previously been cited and incorporated herein.

The interpolymer can be used as a foam. Methods of foaming polymers are well-known in the art as evidenced by U.S. Pat. Nos. 2,450,436; 2,515,250; 2,740,157; 2,774,991; 2,838,801; 3,770,668; 3,897,528; 3,954,929; 3,960,792; 4,146,563; and 4,229,396, the teachings of which are incorporated herein by reference thereto. The improvement described in the present invention consists of imparting flame resistance to the interpolymer.

The following comparative tests and examples are intended as illustrations only and are not to be construed so as to limit the invention as set forth in the claims and specification.

EXAMPLE 1

Forty grams of styrene-maleic anhydride copolymer having about 14 weight percent (about 14.7 mole percent) of maleic anhydride polymerized therein was introduced to the mixing chamber of a Brabender Plasti-Corder ® mixer type REE 6 with roller style mixing blades. The preset temperature of the mixer was 190° C. and the mixer speed was set at 20 revolutions per minute. Then, 19.6 grams of 2,4,5-tribromobenzyl amine were added to the styrene-maleic anhydride copolymer and mixed in the Brabender Plasti-Corder ®. An immediate drop in torque was observed due to the plasticizing effect of the amine. Within 15 minutes, torque had returned to its original value as the amine reacted with the styrene-maleic anhydride copolymer to form the brominated-maleimide derivative. Analysis of the product by X-ray fluorescence, after one hour of mixing, indicated the presence of 18.9 weight percent bromine based on total polymer weight.

Comparative Test 1

Approximately 2 grams of poly(styrene/N-2,4,5-tribromobenzyl)maleimide as produced in Example 1 was placed in an aluminum weighing dish. The weighing dish was then placed on a Corning ® hot plate model PC-351 until the polymer had melted (about 30 seconds). An open flame was then applied to the surface of the melted polymer for 5 seconds and then removed for 5 seconds. The number of repeated flame applications to cause self-sustained combustion for longer than 5 seconds is recorded. Comparative Test 1 was also performed on a sample of styrene-maleic anhydride copolymer.

The results are summarized in Table I.

TABLE I

| Material | Number of flame applications to cause burning of longer than 5 seconds |
| --- | --- |
| Styrene/Maleic Anhydride Control Sample | 1 |
| Poly(styrene/N—2,4,5-tribromobenzyl)maleimide containing the following levels* of bromine: | |
| 9.2% | 10 |
| 18.6% | 16 |
| 18.9% | 17 |

*Weight percent based on total weight polymer.

EXAMPLE 2

Cellular polymer was obtained by combining two grams of the poly(styrene/N-2,4,5-tribromobenzyl)-maleimide prepared in Example 1 in a sealed glass ampule with 2 milliliters of methyl chloride. The ampule was then heated at 200° C. for 1 hour followed by 30 minutes of heating at 150° C. The ampule was then broken. On breaking, the methyl chloride incorporated in the polymer expanded forming a cellular product. An expanding procedure similar to that used in Example 2 was employed to obtain a cellular control sample of non-brominated styrene/maleic anhydride polymer.

Comparative Test 2

The foamed styrene/maleic anhydride polymer and foamed poly(styrene/N-(2,4,5-tribromobenzyl)maleimide produced in Example 2 were compared on the basis of flammability. Open flame was applied to the foamed polymer sample a sufficient length of time to ignite the foam. The flame was then removed and the length of time the foam continued to burn was recorded. The results are summarized in Table II.

TABLE II

| Material | Result |
| --- | --- |
| Styrene/Maleic anhydride foam control | Burned Completely |
| Poly(styrene/N—(2,4,5-tribromobenzyl)maleimide foam containing the following levels* of bromine: | |

| | Burning Time Before Self-Extinguishing |
| --- | --- |
| 9.2% | 10-15 seconds |
| 18.6% | ~1 second |
| 18.9% | ~1 second |

*Weight percent based on total weight polymer.

The present invention is susceptible of being embodied with various alterations and modifications which may differ particularly from those that have been described in the preceding specification and examples. These variations and alterations are possible without departing from the scope of the invention as set forth in the claims.

What is claimed is:

1. A polymeric composition comprising a monoalkenyl aromatic polymer having polymerized therein from about 5 to about 25 mole percent, based on total monomer polymerized therein, of an unsaturated cyclic imide having appended, to the nitrogen atom, a bromine substituted aliphatic or aromatic substituted aliphatic hydrocarbon radical.

2. The composition of claim 1 wherein the bromine substituted aliphatic or aromatic substituted aliphatic hydrocarbon radical is a bromine substituted, aromatic substituted aliphatic hydrocarbon radical.

3. The composition of claim 1 wherein the monoalkenyl aromatic polymer has polymerized therein an ethylenically-unsaturated anhydride.

4. The composition of claim 1 wherein the monoalkenyl aromatic polymer comprises styrene.

5. The composition of claim 1 wherein the imide is maleimide.

6. The composition of claim 1 wherein the bromine substituted aliphatic or aromatic substituted aliphatic hydrocarbon radical is 2,4,5-tribromobenzyl radical.

7. The composition of matter prepared by the process comprising melt blending of a copolymer of a monoalkenyl aromatic monomer and an ethylenically-unsaturated anhydride with a brominated primary aliphatic amine or brominated aromatic substituted aliphatic primary amine at a temperature below the temperature at which the copolymer significantly degrades and for a length of time sufficient to convert an effective amount of the ethylenically-unsaturated anhydride present in the copolymer to an imide.

8. The composition of claim 7 wherein the monoalkenyl aromatic monomer is styrene.

9. The composition of claim 7 wherein the ethylenically-unsaturated anhydride is maleic anhydride.

10. The composition of claim 9 wherein the monoalkenyl aromatic monomer is styrene.

11. The composition of claim 7 wherein the ethylenically-unsaturated anhydride is present in the copolymer in an amount of from about 5 to about 50 mole percent based on total monomer polymerized therein.

12. The composition of claim 7 wherein the brominated primary aliphatic amine or brominated aromatic substituted aliphatic primary amine is 2,4,5-tribromobenzyl amine.

13. The composition of claim 7 wherein the effective amount of anhydride converted to imide is between about 5 and about 25 mole percent based on total monomer polymerized in the copolymer.

14. The composition of matter prepared by the process comprising reacting an ethylenically-unsaturated anhydride with an amount of a brominated primary aliphatic amine or brominated aromatic substituted aliphatic primary amine for a length of time sufficient to react at least part of the ethylenically-unsaturated anhydride with the brominated primary aliphatic amine or brominated aromatic substituted aliphatic primary amine to form an imide, and polymerizing the resultant imide with a monoalkenyl aromatic monomer.

15. The composition of claim 14 wherein the monoalkenyl aromatic monomer is styrene.

16. The composition of claim 14 wherein the ethylenically-unsaturated anhydride is maleic anhydride.

17. The composition of claim 16 wherein the monoalkenyl aromatic monomer is styrene.

18. The composition of claim 14 wherein the imide is present in the polymer in an amount of from about 5 to about 25 mole percent based on total polymer.

19. The composition of claim 14 wherein an ethylenically-unsaturated anhydride is present in the composition in an amount of from about 0 to about 25 mole percent based on total composition weight.

20. The composition of claim 14 wherein the brominated primary aliphatic amine or brominated aromatic substituted aliphatic primary amine is 2,4,5-tribromobenzyl amine.

21. A foamed polymeric composition comprising styrene having maleimide polymerized therein in an amount of from about 5 to about 25 mole percent, said maleimide having appended, to the nitrogen atom, a 2,4,5-tribromobenzyl radical.

* * * * *